Patented Oct. 13, 1942

2,298,660

UNITED STATES PATENT OFFICE 2,298,660

PRODUCTION OF ALKYLATED PHENOLS

Donald R. Stevens, Swissvale, and William A. Gruse, Wilkinsburg, Pa., assignors to Gulf Oil Corporation, Pittsburgh, Pa., a corporation of Pennsylvania No Drawing. Application February 26, 1940, Serial No. 320,970

11 Claims. (Cl. 260—624)

This invention relates to the production of alkylated phenols; and it is particularly concerned with a method of producing tri-alkylated mono-hydroxy phenols having at least one alkyl group ortho to the hydroxyl group and a total of at least four carbon atoms in the alkyl groups ortho to the hydroxyl group, said phenols being insoluble in water and in dilute aqueous alkali solutions and possessing antioxidant properties, and mono-hydroxy-phenol-olefin condensation products containing alkylated phenols of this type, wherein a mono-hydroxy phenol having not more than one alkyl group ortho to the hydroxyl group, or a mixture containing such phenols, is subjected to the action of an olefin in the presence of an acid condensing agent, the product is washed with dilute aqueous alkali solution and the alkali insoluble alkylated phenols are recovered; all as more fully hereinafter set forth and as claimed.

Cracked gasoline and other petroleum products, such as lubricating oils, turbine oils, transformer oils, and the like, are subject to undesirable oxidational changes in storage and in use, with deterioration of quality and character. Even the most drastic refining methods do not remove from these oils all tendency toward such deterioration and in practice it is desirable to add small amounts of compounds having antioxidant properties capable of acting as anti-catalysts; of retarding or inhibiting such undesirable oxidational changes.

It is known that there are many chemical compounds which, in small amount, in a motor fuel will prevent or inhibit the formation of gum. Many of these bodies are phenolic in character. Any of these additions which is otherwise satisfactory but can be withdrawn from the motor fuel by the action of water or the acid and alkaline solutions ordinarily used in refining is undesirable. Alkaline solutions are freely used in refining of petroleum oils, including motor fuels, and it is important to use a body not soluble in or withdrawn by caustic alkali solution. Nearly, but not all, of the usual phenols are soluble in aqueous alkali.

We have found that the solubility or insolubility of alkylated monohydric phenols in dilute aqueous alkali solution is influenced and determined not only by the number and complexity of the substituted alkyl groups but also by the positions in which the various alkyl groups are located relative to the hydroxyl group. In general, an increase in the number of substituted carbon atoms tends to increase solubility in hydrocarbon oil, without particular reference to the positions in which the alkyl groups are substituted. However, the solubility of the alkylated phenols in dilute aqueous alkali solution is largely influenced by the alkyl groups substituted in the 2- and 6- positions, i. e., ortho to the hydroxyl group. An increase in the number of carbon atoms present in the alkyl groups substituted in the 2- and 6-positions produces what has sometimes been referred to as a "krypto" effect, a stereo-chemical effect which shields or protects the hydroxyl group, making it less susceptible to reaction with alkali, and consequently tends to obviate solubility in dilute aqueous alkali solution.

We have found that, in alkyl-substituted monohydroxy phenols, when the sum of the number of carbon atoms present in the alkyl groups occupying the positions ortho to the OH group is four or more, the compound is insoluble in dilute caustic solution. Thus, 2,4,6-tri-tertiary-butyl-phenol and 2,4-di-methyl-6-propyl-phenol are both insoluble in dilute caustic solution. On the other hand, mesitol (2,4,6-tri-methyl-phenol) and 2,6-di-methyl-4-tertiary-butyl-phenol are both soluble in dilute caustic solution. We have found also that those compounds are most advantageous as antioxidants which consist of 2,4,6-tri-alkylated monohydroxy phenols having in a position ortho to the hydroxyl group at least one alkyl substituent having three or more carbon atoms, e. g., a propyl, butyl, amyl, or higher alkyl group. The other alkyl substituents may be the same or other alkyl groups, e. g., methyl, ethyl or higher alkyl groups.

Within this class of compounds in which the 2-, 4- and 6-positions are occupied by alkyl substituents (the original OH group of the phenol being considered to be in the 1-position; and which general class excludes phenolic compounds having more than one hydroxyl group and phenolic derivatives having substituents other than hydroxyl and alkyl groups) there are a large number of individual compounds varying between themselves in specific properties but all possessing substantial anti-oxidant properties and all being insoluble in dilute aqueous alkali solution. Typical examples of compounds of this class are those having one alkyl group containing three or more carbon atoms ortho to the hydroxyl group, such as 2-isopropyl-4,6-di-methyl phenol; 2-tertiary-butyl-4,6-di-methyl phenol; 2-tertiary-amyl-4,6-di-methyl-phenol, and the like; those having two alkyl groups each containing three or more carbon atoms ortho to the hydroxyl group, such as 4-methyl-2,6-di-isopropyl phenol; 4-methyl-2,6-di-tertiary-butyl-phenol; 4 - methyl-2,6-di-tertiary-amyl-phenol; 4 - ethyl -2,6 - di - sec - butyl - phenol and the like; those having alkyl groups containing three or more carbon atoms in each of the 2-, 4- and 6-positions, such as 2,4,6-tri-isopropyl-phenol; 2,4,6-tri-tertiary-butyl-phenol; 2,4,6-tri-tertiary-amyl-phenol; 2,6-di - tertiary - butyl - 4 - amyl-phenol and the like.

In our copending application Ser. No. 136,504, filed April 12, 1937, which is a continuation-in-part of our earlier filed applications Serial No. 578,412, filed December 1, 1931, now U. S. Patent No. 2,001,634; Serial No. 591,928, filed February 9, 1932, now U. S. Patent No. 2,017,610; Serial No. 702,258, filed December 13, 1933, now U. S. Patent No. 2,061,111, and of our copending application Serial No. 110,014, filed November 9, 1936, we have described and claimed compositions, particularly petroleum products, containing these alkali insoluble alkylated phenols as antioxidants.

The present application is a continuation-in-part of our copending application Serial No. 136,504, filed April 12, 1937, now U. S. 2,202,877, and of our copending application Serial No. 110,014, filed November 9, 1936, now U. S. 2,202,876, and is directed to a method of producing alkali insoluble alkylated phenols of the type described ante in which monohydroxy phenols are reacted with olefins containing three or more carbon atoms in the presence of an acid condensing agent, the reaction product is washed with dilute aqueous alkali solution and the alkali insoluble portion is recovered and may be fractionally distilled for the isolation of individual alkylated phenols.

We have found that when monohydroxy phenols having not more than one alkyl group ortho to the hydroxyl group or mixtures consisting essentially of such phenols, such as the commercial cresols, and xylenols or the cresylic acids which are obtained from coal tar or petroleum, are reacted with olefins containing at least three carbon atoms and the reaction product is washed with a dilute aqueous alkali solution, a product containing alkali insoluble alkylated phenols is obtained. This material may be further purified by fractionation, and substantially pure 2,4,6-tri-alkylated phenols insoluble in dilute aqueous alkali can be isolated.

By the term "dilute aqueous alkali solutions" we mean aqueous solutions containing up to about 15 per cent caustic soda or solutions of equivalent alkalinity.

As phenolic raw materials for the preparation of compounds according to our process we may use phenol, ortho-cresol, para-cresol, 2,4-di-methyl-phenol, ortho-butyl-phenol, para-butyl-phenol, ortho-amyl-phenol, paraamyl-phenol and other mono- and di-substituted mono-hydroxyl phenols in which the substituted group or groups occupy an ortho or para position, or both, relative to the hydroxy group as well as mixtures containing these phenols such as cresylic acids derived from coal tar or petroleum. For example, a suitable phenolic material may be obtained from petroleum by extracting a petroleum oil boiling above 350° F. with a solution of a strong alkali, such as caustic soda or caustic potash or onium type bases, for example, tri-methyl sulfonium hydroxide, benzyl tri-methyl ammonium hydroxide and the like, dissolved in an oil immiscible solvent selective for phenols and not reactive with the alkali, for example, aliphatic alcohols, such as methyl, ethyl and isopropyl alcohol, glycols, glycerols and the like; removing the solvent from the extract and acidifying the residue to recover the crude phenolic material. Upon fractionation this phenolic material makes an excellent raw material for use in conjunction with our process.

Among the olefinic starting materials, we have found that ethylene is very stable, and it is often difficult to effect direct alkylation of a phenol with this olefin by the method of our invention. On the other hand, the higher olefins, particularly propylenes, butylenes, and amylenes, are satisfactory olefinic starting materials, either alone or in admixture with other hydrocarbons. Cracked gasoline as normally produced, and the heavier of the hydrocarbons usually found as vapors in cracking-still gases (these being sometimes called "wild" products), contain varying quantities of these olefins as well as higher olefins and may be used as starting materials. On the other hand, the olefins may be used in isolated form or in admixture with other closely related olefins and paraffins. For example, so-called "debutanizer" gas, consisting largely of butane and butylenes, may be employed as a starting material, as may propylene, isobutylene and tri-methyl-ethylene themselves.

It will be readily understood that when it is desired to prepare individual compounds within the class specified, free or substantially free from other compounds within the class, the raw materials should be selected with that aim in view and should not comprise mixtures of olefins or mixtures of various phenols except in those instances in which the natures of the individual products permit easy isolation and separation after alkylation. In mixtures of olefins and paraffins, the presence of the corresponding or other paraffins has no effect upon the operation other than to reduce the concentration of the olefin. Thus, in the manufacture of 2,4,6-tri-tertiary-butyl-phenol, we may employ as a starting material a mixture of butane and isobutylene; the butane does not enter into the reaction with the phenol.

When the compounds within the class defined are to be employed as antioxidants or gum inhibitors for gasoline and other light hydrocarbon oils, it is ordinarily preferred to use as olefinic starting materials olefins containing from 3 to 5 carbon atoms per molecule, thus obtaining propyl, butyl or amyl substitution groups. The resultant compounds may also be employed as anti-oxidants for higher boiling oils, such as lubricating oils, turbine oils and transformer oils. For these oils, advantageous results may also sometimes be obtained by utilizing the higher olefins having 6 or more carbon atoms per molecule and yielding alkylated phenols in which the number of carbon atoms in the alkyl substitution groups, or some of them, are correspondingly high.

The condensation reaction is advantageously conducted at somewhat elevated temperatures, for example, temperatures up to 180° F. or thereabouts, and under atmospheric or moderately elevated pressures in the presence of the usual acid condensing agents such as sulfuric acid, phosphoric acid, anhydrous aluminum chloride, boron trifluoride, ferric chloride, hydrogen chloride and the like. Sulfuric acid is ordinarily most satisfactory by reason of its efficiency and cheapness. The amount of acid condensing agent required is relatively small with respect to the amount of phenol; in some instances the amount of acid condensing agent required is as little as 1 per cent of the phenol or less, being in such instance present in catalytic amounts. In using sulfuric acid as the condensing agent, and when it is desired to utilize the olefin efficiently, it is usually better to employ the acid in an amount equal to not less than about 3 per cent of the phenol. More than 10 per cent of the condensing agent, on the phenol, is not ordinarily worth while. At higher temperatures and pressures, for example, from 400° to 575° F. or higher, and 1000 pounds per square inch or somewhat higher, condensing agents are usually unnecessary and may be omitted. In certain instances, intermediate temperatures, of say 180° to 400° F., especially up to 300° F., with pressures up to 1000 pounds per square inch, are advantageous, even when operating in the presence of catalysts; as for example in reacting propylene or the normal butenes with a phenol. The temperatures should not be so high as to cause decomposition of the phenol employed. It is ordinarily advantageous to avoid temperatures and pressures so high that the product obtained will predominate in polymerized olefins, the formation of which is enhanced by heat and pressure.

The reactions involve no special difficulties, the reacting ingredients being simply contacted, either continuously or in batch operation. After completion of the reaction, the products are washed with an aqueous solution of caustic soda or other equivalent alkali, the strength of the caustic soda solution being preferably not over 15 per cent. This washing operation removes any remaining acid material and also removes any unreacted phenolic starting material as well as alkylation products in which the alkylation has proceeded to a point less than desired. For example, in the manufacture of 2,4,6-tri-tertiary-butyl-phenol from isobutylene and phenol, minor amounts of mono- and di-tertiary-butyl-phenols are produced. Some of these products are soluble in dilute alkali and may be readily removed in this manner. Water washing may also be resorted to wherever desired.

Since the alkali wash is such an important step in the process of our invention, the concentration and type of alkali used should be carefully chosen. We have found that an aqueous solution of caustic soda, preferably not over 15 per cent in strength, affords an excellent washing solution. We may use other alkalies such as the hydroxides of potassium or ammonium. The causticity of the wash when these other alkalies are used should not be greater than that of 15 per cent caustic soda solution.

The final products may be distilled, under ordinary pressure or under vacuum, and in some cases recrystallized in the usual manner to remove extraneous products such, for example, as olefin polymers, mono-alkylated phenols (where dialkyl or trialkyl are the end products desired) and isomeric phenyl ethers, which may be formed to some extent during the reaction, and to obtain substantially pure products. Other concentration methods may also be employed where suitable, for example, extraction with alcoholic potash.

The following examples will serve to illustrate and exemplify our invention:

*Example 1.*—In this example, 2,4,6-tri-tertiary-butyl-phenol was prepared from phenol and isobutylene gas in the presence of sulfuric acid. We find it advantageous to employ ordinary concentrated sulfuric acid in amounts corresponding to from 3 to 5 per cent by weight of the phenol employed; with this concentration the rate of condensation is sufficiently high, while with higher amounts of acid the tendency toward polymerization of the isobutylene is increased. We may also state that we find it advantageous in obtaining a major proportion of the desired product in the total products of reaction to maintain the reaction temperature at about 50° C. during the first period of condensation, until the condensation products form a magma or mush, after which we find it desirable to raise the temperature enough to retain the reaction mass in a more or less liquid condition, thereby facilitating contact between the reacting materials.

Thus, 500 parts by weight of phenol (USP) and 25 parts by weight of commercial concentrated sulfuric acid were introduced into a suitable reaction vessel provided with a gas inlet and a gas outlet, suitable agitating means, and a coil for heating or cooling the contents of the reaction vessel. Isobutylene was then bubbled through the phenol, which was maintained at a temperature of 50° C., with agitation, until the reaction mixture took on the appearance of a magma, when the temperature was raised to 100° C. In this example the pressure was atmospheric.

After the reaction had been substantially completed, as indicated by the fact that the reaction mixture no longer gained in volume and by the flow of isobutylene at the gas exit, the flow of gas was stopped. The reaction mixture was washed with dilute aqueous caustic soda solution. It was then distilled in a column under 10 mm. pressure. The lower boiling fractions thus obtained consisted largely of 2,4-di-tertiary-butyl-phenol while the remaining fraction consisted almost entirely of 2,4,6-tri-tertiary-butyl-phenol boiling at 140° C. under 10 mm. pressure. This fraction amounted to approximately 65 per cent of the total washed reaction product. On cooling, this fraction solidified to white crystals having a melting point of 130° to 131° C. After crystallization from alcohol, the following constants were obtained for the substituted pure product:

|  | Found | Theoretical data for 2:4:6-tri-tertiary-butyl-phenol |
|---|---|---|
| Melting point, °C | 130–131 |  |
| Ultimate analysis, percent by weight: |  |  |
| Carbon | 82.35 | 82.44 |
| Hydrogen | 11.40 | 11.45 |
| Oxygen | 6.25 | 6.11 |
| Boiling point, °C.: |  |  |
| At 10 mm | 140 |  |
| At 742 mm | 266–270 |  |

*Example 2.*—This example relates to the preparation of a compound identified as 2,4-di-methyl-6-tertiary-butyl-phenol. In preparing this compound, the general procedure was essentially the same as that described in Example 1; 500 parts by weight of 2,4-di-methyl-phenol (B. P. 102°/20 mm.) were introduced into the reaction vessel with 25 parts by weight of commercial concentrated sulfuric acid and the temperature was then brought to and maintained at 70° C. Isobutylene gas was then passed through the vessel while the contents were subjected to agitation. The reaction proceeded vigorously with evolution of considerable heat, and cooling was necessary in order to maintain the reaction temperature at about 70° C. until toward the end of the reaction, when, the evolution of heat having ceased, it was necessary to apply some external heat to maintain the temperature.

After the reaction had been completed, the reaction products were washed hot with an equal volume of a weak aqueous caustic soda solution. The oily layer which separated upon washing was an amber colored syrupy liquid and upon distillation under 20 mm. pressure the greater part of it distilled over as a constant-boiling fraction at 111° C. This fraction of the distillate was a colorless syrupy liquid having a specific gravity of 0.9480 and a refractive index of 1.4960. The ultimate analysis of the product corresponded almost exactly to the theoretically calculated ultimate analysis for 2,4-di-methyl-6-tertiary-butyl-phenol.

*Example 3.*—This example relates to the preparation of 2,4-di-methyl-6-isopropyl-phenol. This compound was prepared by reacting 25 parts by weight of 2,4-di-methyl-phenol, 1.25 parts by weight of concentrated sulfuric acid and 50 parts by weight of propylene in a high pressure bomb for one hour at 100° C. under 900 pounds per square inch pressure. After cooling, the products from the bomb were washed with a solution of 10 per cent caustic soda solution. The alkali insoluble material was water washed and dried and a portion thereof was then distilled under vacuum (11 mm.). Upon distillation under vacuum, as aforesaid, the distillate was divided into two fractions, a fraction (A) coming over between 93° and 96° C. and a fraction (B) coming over between 113° and 115° C. The observed properties of these two fractions were as follows:

|  | Fraction (A) | Fraction (B) |
| --- | --- | --- |
| Refractive index, at 20° C | 1.5038 | 1.5178 |
| Specific gravity, 25°/4° | 0.9345 | 0.9523 |
| Per cent carbon | 79.97 | 80.84 |
| Per cent hydrogen | 9.71 | 9.91 |

Inasmuch as 2,4-di-methyl-6-isopropyl-phenol should theoretically contain 80.49 per cent carbon and 9.75 per cent hydrogen, it will be observed that the carbon-hydrogen analysis of both fractions fit the calculated values closely. However, fraction (A) was low in antioxidant value; 0.05 per cent of this material raised the oxygen stability period of a certain gasoline from 1¼ hours to only 2½ hours. This fraction is believed to consist largely of 2,4-di-methyl-phenol-isopropyl-ether, an isomeric compound. Fraction (B) was considerably higher in antioxidant value; 0.05 per cent of this material raised the oxygen stability period of a certain gasoline from 1¼ hours to 5 hours. In this, as in most other instances where isomeric ethers are obtained along with the desired alkylated phenols, there is a wide difference between the boiling points of the two isomers, facilitating separation by distillation.

While we have described our invention hereinabove with respect to various specific illustrative examples, it will be obvious that our invention is not limited to the details of such examples, but may be variously practiced and embodied within the scope of the claims hereinafter made.

What we claim is:

1. A process of producing an oil-soluble mono-hydroxy-phenol-olefin condensation product containing in substantial proportion a 2,4,6-tri-alkylated-mono-hydroxy-phenol having a total of at least 4 carbon atoms in the alkyl groups ortho to the hydroxyl group, insoluble in water and dilute aqueous alkali solution and having antioxidant properties, comprising subjecting the mono-hydroxy-phenol to the action of an olefin containing at least 3 carbon atoms in the presence of a relatively small amount of an acid condensing agent, washing and neutralizing the reaction mixture with dilute aqueous alkali solution having an alkalinity equivalent to that of an aqueous solution containing up to 15.0 per cent of caustic soda, and fractionally distilling the washed product.

2. A process of producing an antioxidant product containing in substantial proportion a 2,4,6-tri-alkylated mono-hydroxy-phenol having a total of at least 4 carbon atoms in the alkyl groups ortho to the hydroxyl group and insoluble in water and dilute aqueous alkali solution comprising subjecting the mono-hydroxy-phenol to the action of an olefin containing at least 3 carbon atoms in the presence of a relatively small amount of a sulfuric acid condensing agent, washing and neutralizing the reaction mixture with dilute aqueous alkali solution having an alkalinity equivalent to that of an aqueous solution containing up to 15.0 per cent of caustic soda and fractionally distilling the washed product.

3. A process of producing an antioxidant product containing in substantial proportion a 2,4,6-tri-alkylated mono-hydroxy-phenol having a total of at least 4 carbon atoms in the alkyl groups ortho to the hydroxyl group and insoluble in water and dilute aqueous alkali solution comprising subjecting a mixture consisting essentially of mono-hydroxy-phenols to the action of an olefin containing at least 3 carbon atoms in the presence of a relatively small amount of a sulfuric acid condensing agent, washing and neutralizing the reaction mixture with dilute aqueous alkali solution having an alkalinity equivalent to that of an aqueous solution containing up to 15.0 per cent of caustic soda and fractionally distilling the washed product.

4. A process of producing a mono-hydroxy-phenol-olefin condensation product containing in substantial proportion an alkylated mono-hydroxy phenol having alkyl substitution groups in the 2-, 4- and 6- positions and a total of at least four carbon atoms in the alkyl substituents ortho to the hydroxyl group comprising subjecting a compound selected from the group consisting of phenol, the mono-alkyl substituted phenols and the di-alkyl substituted phenols in which the alkyl substituents occupy the positions ortho and para to the hydroxyl group, to the action of an olefin containing at least three carbon atoms in the presence of an acid condensing agent, washing and neutralizing the product with dilute aqueous alkali solution having an alkalinity equivalent to that of an aqueous solution containing up to 15.0 per cent of caustic soda and fractionally distilling the alkali-insoluble portion.

5. A process of producing an oil soluble 2,4,6-tri-alkylated-mono-hydroxy phenol having a total of at least 4 carbon atoms in the alkyl groups ortho to the hydroxyl group and insoluble in water and dilute aqueous alkali solution and having antioxidant properties comprising subjecting a mixture consisting essentially of mono-hydroxy phenols to the action of an olefin containing at least three carbon atoms in the presence of 1.0 to 10.0 per cent by weight of a sulfuric acid condensing agent, washing and neutralizing with dilute aqueous alkali solution having an alkalinity equivalent to that of an aqueous solution containing up to 15.0 per cent of caustic soda, and fractionally distilling the product.

6. A process of producing an oil-soluble 2,4,6-tri-alkylated mono-hydroxy phenol olefin condensation product containing in substantial proportion a 2,4,6-tri-alkylated-mono-hydroxy phenol having a total of at least 4 carbon atoms in the alkyl groups ortho to the hydroxyl group and insoluble in water and in dilute aqueous alkali solution comprising subjecting a mono-hydroxy phenol having not more than one alkyl substituent ortho to the hydroxyl group to the action of an olefin containing at least three carbon atoms, in the presence of a relatively small amount of an acid condensing agent and recovering the product insoluble in dilute aqueous alkali solution having an alkalinity equivalent to that of a solution containing up to 15.0 per cent of caustic soda.

7. A process of producing mono-hydroxy alkylated phenols having alkyl substituents in the 2-, 4- and 6-positions, the sum total of carbon atoms in the positions ortho to the hydroxyl group being not less than 4, comprising subjecting a mono-hydroxy phenol having not more than one alkyl group ortho to the hydroxyl group to the action of an olefin containing at least three carbon atoms in the presence of a relatively small amount of a sulfuric acid condensing agent, and recovering the product insoluble in dilute aqueous alkali solution having an alkalinity equivalent to that of a solution containing up to 15.0 per cent of caustic soda.

8. A process of producing a 2,4,6-tri-alkylated-mono-hydroxy phenol insoluble in dilute aqueous alkali solution and having a total of at least four carbon atoms in the alkyl groups ortho to the hydroxyl group, comprising subjecting a mono-hydroxy phenol having not more than one alkyl substituent ortho to the hydroxyl group to the action of an olefin containing at least three carbon atoms, in the presence of a relatively small amount of an acid condensing agent, washing and neutralizing with dilute aqueous alkali solution having an alkalinity equivalent to that of an aqueous solution containing up to 15.0 per cent of caustic soda and fractionally distilling the product.

9. A process of producing an oil-soluble 2,4,6-tri-alkylated-mono-hydroxy phenol having a total of at least 4 carbon atoms in the alkyl groups ortho to the hydroxyl group and insoluble in water and in dilute aqueous alkali solution and having antioxidant properties comprising subjecting a mono-hydroxy phenol to the action of an olefin containing at least three carbon atoms in the presence of 1.0 to 10.0 per cent of a sulfuric acid condensing agent at an elevated temperature, washing and neutralizing with dilute aqueous alkali solution having an alkalinity equivalent to that of an aqueous solution containing up to 15.0 per cent of caustic soda and fractionally distilling the washed product.

10. A process of producing an oil-soluble 2,4,6-tri-alkylated-mono-hydroxy phenol having a total of at least 4 carbon atoms in the alkyl groups ortho to the hydroxyl group and insoluble in water and in dilute aqueous alkali solution and having anti-oxidant properties comprising subjecting a mono-hydroxy phenol to the action of an olefin containing at least three carbon atoms, in an amount at least sufficient for complete reaction, in the presence of 1.0 to 10.0 per cent of a sulfuric acid condensing agent at an elevated temperature, washing and neutralizing with dilute aqueous alkali solution having an alkalinity equivalent to that of an aqueous solution containing up to 15.0 per cent of caustic soda and fractionally distilling the washed product.

11. A process of producing an oil-soluble 2,4,6-tri-alkylated-mono-hydroxy phenol having a total of at least 4 carbon atoms in the alkyl groups ortho to the hydroxyl group and insoluble in water and in dilute aqueous alkali solution and having antioxidant properties comprising subjecting a mono-hydroxy phenol to the action of an olefin containing at least three carbon atoms, in an amount at least sufficient for complete reaction, in the presence of 1.0 to 10.0 per cent of a sulfuric acid condensing agent at an elevated temperature, washing with an excess of an aqueous alkali solution having an alkalinity equivalent to that of an aqueous solution containing up to 15.0 per cent caustic soda and fractionally distilling the washed product.

DONALD R. STEVENS.
WILLIAM A. GRUSE.